United States Patent [19]
Gillet et al.

[11] 4,118,648
[45] Oct. 3, 1978

[54] SALIENT POLE OF A SYNCHRONOUS ELECTRIC MACHINE

[75] Inventors: Roger Gillet; Jean Allégre, both of Belfort, France

[73] Assignee: Societe Generale de Constructions Electriques et Mecaniques Alsthom, Paris, France

[21] Appl. No.: 736,604

[22] Filed: Oct. 28, 1976

Related U.S. Application Data

[63] Continuation of Ser. No. 581,994, May 29, 1975, abandoned.

[30] Foreign Application Priority Data

Jun. 13, 1974 [FR] France ............................. 74 20591

[51] Int. Cl.² .............................................. H02K 1/24
[52] U.S. Cl. ..................................... 310/269; 310/42; 310/217
[58] Field of Search ............... 310/269, 194, 254, 259, 310/264, 49, 162, 163, 182, 183, 211, 42, 197, 216–218

[56] References Cited

U.S. PATENT DOCUMENTS

| | | | |
|---|---|---|---|
| 1,033,379 | 7/1912 | Burke | 310/269 |
| 3,849,683 | 11/1974 | Leistner | 310/183 |

FOREIGN PATENT DOCUMENTS

| | | | |
|---|---|---|---|
| 1,550,017 | 12/1968 | France | 310/269 |
| 671,468 | 2/1939 | Fed. Rep. of Germany | 310/42 |
| 1,070,284 | 12/1959 | Fed. Rep. of Germany | 310/269 |
| 1,196,776 | 7/1965 | Fed. Rep. of Germany | 310/269 |
| 62,882 | 7/1968 | Fed. Rep. of Germany | 310/269 |

*Primary Examiner*—R. Skudy
*Attorney, Agent, or Firm*—Sughrue, Rothwell, Mion, Zinn and Macpeak

[57] ABSTRACT

The invention concerns salient poles of synchronous electric machines. It is characterized in that the pole shoe of these poles is solid, whereas the polar body is deformable and can follow the thermal expansions of the pole shoe. It is applied to synchronous machines which can start up as asynchronous motors.

8 Claims, 4 Drawing Figures

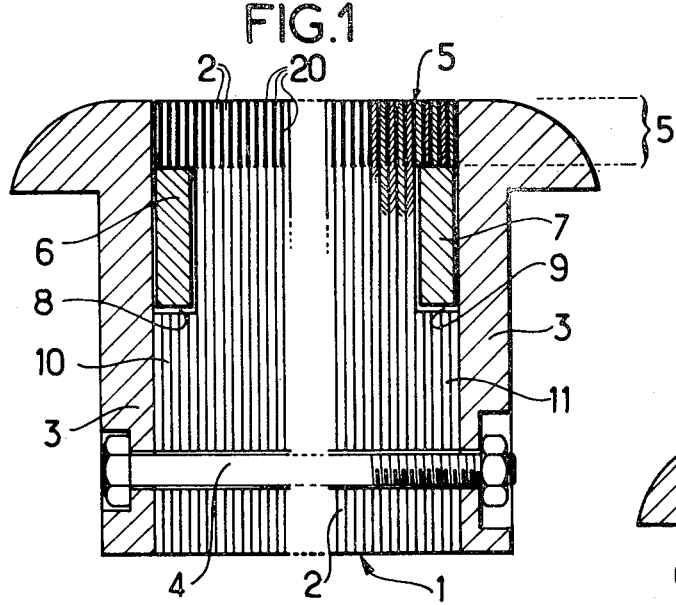
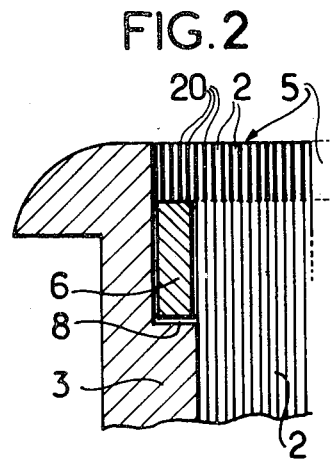
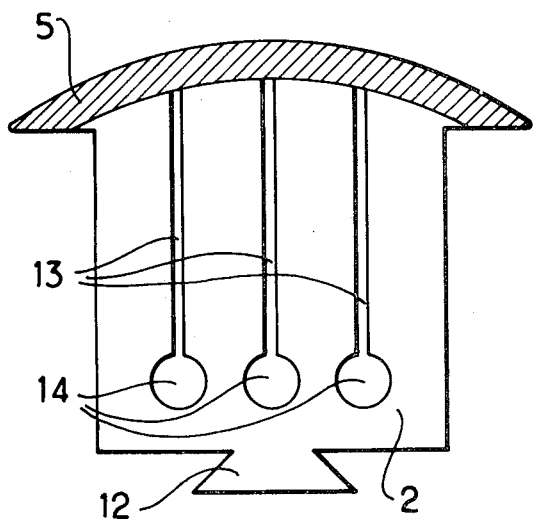

SALIENT POLE OF A SYNCHRONOUS ELECTRIC MACHINE

This is a continuation of application Ser. No. 581,994, filed May 29, 1975, now abandoned.

BACKGROUND OF THE INVENTION

1. FIELD OF THE INVENTION

The present invention concerns the salient poles of synchronous electrical machines and, more particularly, of synchronous machines intended for starting up contingently as synchronous motors and comprising, for that purpose, a damping system constituted by a surface of zone of the pole shoe.

2. Description of the Prior Art

That surface zone of each pole is the seat of a flow of Focault currents during the asynchronous operation of the machine; interpolar connections enable the passing of those currents from one pole to the other.

That surface zone undergoes heating which increases as the energy to be brought into play to bring the rotor into synchronism is increased and as the starting up time is reduced. In the case where the poles are completely solid, the heating affects only a small surface thickness of each pole, the remainder of the polar body keeping its original temperature. Great thermal stresses which limit the use of this type of pole result from this.

The present invention is intended to reduce greatly these thermal stresses by giving the polar body sufficient deformability to enable it to follow more freely the expansions of the heated surface zone.

SUMMARY OF THE INVENTION

For that purpose, the invention provides a salient pole of a synchronous electric machine forming, in a single block, a radially internal polar body and a radially external pole shoe, characterized in that the pole shoe is solid, whereas the polar body is deformable and can follow the thermal expansions of the pole shoe.

The polar body can, more particularly, be constituted by a stack of metal sheets. These metal sheets can be thin metal sheets stacked axially and clamped between two polar end plates by clamping rods. They can also be thick metal sheets connected together in their radially internal region and having a shallow hollowed out radially intermediate portion extending between that radially internal region and the pole shoe so that the axial stack of these thick metal sheets may have a certain deformability in the axial direction. The deformability of the polar body in the axial tangential direction can be obtained by radial slots extending from the pole shoe to holes situated in the radially internal region of the metal sheets.

The pole shoe can be formed by welding the metal sheets together in their peripheral region. Their periphery can also be coated with a metallic layer obtained, more particularly, by depositing with an electric arc, by metallisation or by electrolytic depositing. These various embodiments for forming a pole shoe can be combined and that pole shoe can be constituted by several different layers which succeed each other in the radial direction.

With reference to the accompanying diagrammatic figures, examples of embodiment of the invention, having no limiting character, will be described, thus making it possible to bring out other characteristics of the invention.

BRIEF DESCRIPTION OF THE DRAWINGS

FIG. 1 is an axial cutaway view of a salient pole of the present invention.

FIG. 2 is a part axial cutaway view of a variant of embodiment of the salient pole in FIG. 1.

FIG. 3 is a view of a metal sheet for making up the salient pole according to FIGS. 1 or 2.

FIG. 4 is a fragmentary axial cutaway view of a salient pole formed by thick metal sheets constituting another embodiment of the invention.

DESCRIPTION OF THE PREFERRED EMBODIMENTS

In FIG. 1, a polar body 1 is formed in a conventional way by an axial stack of thin metal sheets 2 cut out with a press and clamped together, between two polar plates 3, by clamping rods 4.

At the periphery of that polar body, on the same side as the pole which will be on the edge of the air gap of the electric machine when the pole is installed on the latter, a solid zone 5, constituting the pole shoe and fulfilling the function of a damper is formed. Here, this zone 5 is obtained by welding 20 of the metal sheets 2 together down to a certain depth, but that zone 5 could also be formed by adding a metallic layer onto the polar body 1. The metal of that solid zone 5 can be different from that of the metal sheets 2, the only necessary condition being that it must be possible to make it integral with the metal sheets 2 to form a one-piece assembly.

The characteristics such as thickness, resistivity, the coefficient of expansion . . . , of that zone 5 are determined according to electromagnetic or mechanical functions. The deforming of the thin metal sheets 2 enables the zone 5 to expand axially freely, this greatly reducing the axial stresses.

Connections 6, 7 are placed under the axial ends of the pole shoe 5, in the recesses 8, 9 formed due to the fact that the stack of metal sheets does not extend up to the axial ends of the pole shoe. In FIG. 1, these recesses 8, 9 have been formed by using end metal sheets 10, 11 which are shorter than the normal sheets 2 of the polar body. In the case of FIG. 2, which represents only an end portion of the salient pole, such recesses are formed in a hollowed out portion of the polar plates 3. These connections 6, 7 enable an electric connection between neighbouring poles of an electric machine and they can be constituted simply by two rings each connecting the assembly formed by all the poles.

FIG. 3 shows a metal sheet 2 with a dove-tail appendage 12 enabling the fixing of the metal sheet on the rim of a rotor. The weld or the metallic charge which forms a solid peripheral zone constituting the pole shoe is shown at 5. To avoid the tangential stresses, these metal sheets 2 can be provided with radial slots 13 extending from the pole shoe 5 to holes 14 situated in the radially internal region of the metal sheets. These holes 14 can, more particularly, be used for the clamping rods 4 to pass through.

In FIG. 4, the polar body 1 is formed by thick metal sheets 15 connected together by welding for example in their radially internal portion 16 and having a certain axial resilience due to hollowed out portions 17 formed in a fraction of the thickness of the metal sheets, within radially intermediate portion lying between the said internal radial portion 16 and a radially external portion 18 where the metal sheets 15 are also welded to each other to form a part of the pole shoe which is completed by a metallic coating 19.

Thus, in each embodiment, the sheets are axially clamped by rods or by welding at their radially inner and outer portions, but are unclamped throughout their full radial length of the radially intermediate portion integrally joining said radially inner and radially outer portions.

I claim:

1. In a salient pole of a synchronous electric machine, said salient pole comprising: a radially internal polar body and a radially external polar shoe in the form of a single block, said block being formed of an axial stack of metal sheets, each sheet having integrally, a radially internal portion and a radially external portion, clamping means for axially clamping the metal sheets together, the radially external portion of said metal sheets being metal welded together to form an electrically conductive pole shoe, the improvement wherein said clamping means are disposed at the radially internal portion of said sheets with said sheets being unclamped between said radially internal and radially external portions and the portion of said sheets between said radially internal and radially external portions being of reduced axial thickness to form a shallow hollowed out portion extending between said radially internal portion and said pole shoe.

2. The salient pole according to claim 1, wherein said metal sheets bear, at their periphery, at least one metallic coating forming at least a part of the solid pole shoe.

3. The salient pole according to claim 2, wherein said metallic coating comprises an electric arc deposit.

4. The salient pole according to claim 2, wherein said metallic coating comprises a metal spray.

5. The salient pole according to claim 2, wherein said metallic coating comprises an electrolytic deposit.

6. The salient pole according to claim 1, wherein said metal sheets comprise radial slots extending from the pole shoe to holes situated in the radially internal portion of said metal sheets.

7. The salient pole according to claim 6, wherein said holes carry clamping rods for clamping the stack of metal sheets together and forming said clamping means.

8. The salient pole according to claim 1, wherein the stack of metal sheets at each side have recesses under the axial ends of the pole shoe and said recesses carry circumferential connections for electrically linking the poles.

* * * * *